US012614501B2

(12) United States Patent
Saeedi et al.

(10) Patent No.: US 12,614,501 B2
(45) Date of Patent: Apr. 28, 2026

(54) MULTIPLE-ROW DISPLAY DRIVING TO MITIGATE TOUCH SENSOR SUBSYSTEM INTERACTION

(71) Applicant: Apple Inc., Cupertino, CA (US)

(72) Inventors: Saman Saeedi, San Diego, CA (US);
Hyunwoo Nho, Palo Alto, CA (US);
Myungjoon Choi, San Diego, CA (US);
Jie Won Ryu, San Jose, CA (US);
Kyung Wook Kim, Saratoga, CA (US);
Vehbi Calayir, Santa Clara, CA (US);
Kingsuk Brahma, Mountain View, CA (US); Jason N Gomez, Campbell, CA (US); Kwang Soon Park, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/217,028

(22) Filed: Jun. 30, 2023

(65) Prior Publication Data

US 2024/0029625 A1     Jan. 25, 2024

Related U.S. Application Data

(60) Provisional application No. 63/390,872, filed on Jul. 20, 2022.

(51) Int. Cl.
*G09G 3/36*          (2006.01)
*G06F 3/041*          (2006.01)
(Continued)

(52) U.S. Cl.
CPC ......... *G09G 3/2096* (2013.01); *G06F 3/0418* (2013.01); *G09G 3/32* (2013.01); *G09G 3/3266* (2013.01); *G09G 3/3275* (2013.01);

*G09G 3/3611* (2013.01); *G09G 3/3648* (2013.01); *G09G 2310/0202* (2013.01); (Continued)

(58) Field of Classification Search
CPC .. G09G 3/3648; G09G 3/3677; G09G 3/3266; G09G 3/3611; G09G 3/32; G09G 3/2096; G09G 2310/0202; G09G 2310/0224; G09G 2310/0227; G09G 2320/0266; G09G 2360/18; G09G 3/3674; G09G 3/20; G09G 3/3275; G09G 2310/0213; G09G 2310/0205; G09G 2300/08; G06F 3/0418; G06F 3/041; G06F 3/0412
See application file for complete search history.

(56) References Cited

U.S. PATENT DOCUMENTS 6,825,835 B2    11/2004  Sano et al.
7,027,013 B2     4/2006  Ouellete et al.
(Continued)

OTHER PUBLICATIONS

Partial Search Report for International Patent Application No. PCT/US2023/027846 dated Nov. 16, 2023; 13 pgs.

*Primary Examiner* — Dismery Mercedes
(74) *Attorney, Agent, or Firm* — Fletcher Yoder, P.C.

(57)          ABSTRACT

Systems and methods for programming an electronic display in a double-row manner are provided. A system may include processing circuitry that generates image data and an electronic display that programs multiple rows of display pixels with different pixel data of the image data at the same time. This may allow double-row interlaced driving to reduce or eliminate image artifacts due to intra-frame pauses.

22 Claims, 10 Drawing Sheets

(51) Int. Cl.

| | |
|---|---|
| *G09G 3/20* | (2006.01) |
| *G09G 3/30* | (2006.01) |
| *G09G 3/32* | (2016.01) |
| *G09G 3/3266* | (2016.01) |
| *G09G 3/3275* | (2016.01) |

(52) U.S. Cl.
CPC ............... *G09G 2310/0205* (2013.01); *G09G 2310/0213* (2013.01); *G09G 2310/0224* (2013.01); *G09G 2310/0227* (2013.01); *G09G 2310/08* (2013.01); *G09G 2320/0266* (2013.01); *G09G 2360/18* (2013.01)

(56) References Cited

U.S. PATENT DOCUMENTS

| | | | |
|---|---|---|---|
| 7,742,019 B2 | 6/2010 | Takahara | |
| 9,069,412 B2 | 6/2015 | Tanaka et al. | |
| 9,575,610 B2 | 2/2017 | Hotelling et al. | |
| 9,805,692 B2 | 10/2017 | Reynolds et al. | |
| 10,483,475 B2 | 11/2019 | Kurasawa et al. | |
| 10,964,235 B1 | 3/2021 | Yu et al. | |
| 11,322,095 B1 | 5/2022 | Zhuang et al. | |
| 11,605,330 B1 | 3/2023 | Choi et al. | |
| 2004/0222959 A1* | 11/2004 | Lin ...................... G09G 5/395 |
| | | | 345/98 |
| 2005/0062711 A1* | 3/2005 | Kobayashi .............. G09G 3/20 |
| | | | 345/100 |
| 2009/0167790 A1* | 7/2009 | Lin ......................... G09G 3/20 |
| | | | 345/690 |
| 2010/0253668 A1* | 10/2010 | Sugihara .............. G09G 3/3607 |
| | | | 345/100 |
| 2012/0068916 A1* | 3/2012 | Tsubata ................. G02F 1/1362 |
| | | | 345/94 |
| 2012/0105735 A1* | 5/2012 | Tsubata ................ G09G 3/3614 |
| | | | 345/55 |
| 2012/0146967 A1* | 6/2012 | Kim ...................... G09G 3/3688 |
| | | | 345/204 |
| 2013/0027525 A1 | 1/2013 | Kitayama et al. | |
| 2014/0125644 A1* | 5/2014 | Guo ...................... G09G 3/3648 |
| | | | 345/88 |
| 2015/0356934 A1* | 12/2015 | Yamashita ........... G09G 3/3611 |
| | | | 345/99 |
| 2016/0329017 A1* | 11/2016 | Chaji ..................... H05B 47/10 |
| 2017/0337888 A1* | 11/2017 | Nakagawa ........... G09G 3/3666 |
| 2017/0372672 A1 | 12/2017 | Shiomi | |
| 2018/0315383 A1* | 11/2018 | Shimoshikiryoh .. G09G 3/3614 |
| 2019/0088208 A1* | 3/2019 | Chang ................ G09G 3/3266 |
| 2019/0347990 A1* | 11/2019 | Knez ................... G09G 3/2022 |
| 2021/0141449 A1* | 5/2021 | Zhang .................... G06F 3/013 |
| 2022/0122519 A1* | 4/2022 | Bower ................. H01L 25/167 |
| 2022/0122520 A1* | 4/2022 | Cok ..................... G09G 3/2014 |
| 2022/0137409 A1 | 5/2022 | Yamazaki et al. | |
| 2022/0351669 A1* | 11/2022 | Lee ........................... G09G 3/32 |
| 2023/0084423 A1 | 3/2023 | Choi et al. | |
| 2023/0367419 A1* | 11/2023 | Seo ..................... G06F 3/04166 |

* cited by examiner

MULTIPLE-ROW DISPLAY DRIVING TO MITIGATE TOUCH SENSOR SUBSYSTEM INTERACTION

CROSS-REFERENCE TO RELATED APPLICATIONS

This application claims priority to U.S. Provisional Application No. 63/390,872, filed Jul. 20, 2022, entitled "MULTIPLE ROW DISPLAY DRIVING TO MITIGATE TOUCH SENSOR SUBSYSTEM INTERACTION," the disclosure of which is incorporated by reference in its entirety for all purposes.

SUMMARY

This disclosure relates to systems, methods, and devices to reduce image artifacts caused by noise from a touch sensor system and increase the sensitivity of the touch sensor system by applying multiple-row display driving, such as double-row interlaced display driving, to display pixels on electronic displays.

A summary of certain embodiments disclosed herein is set forth below. It should be understood that these aspects are presented to provide the reader with a brief summary of these certain embodiments and that these aspects are not intended to limit the scope of this disclosure.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (µLEDs). By causing different display pixels to emit different amounts of light, individual display pixels of an electronic display may collectively produce images.

In certain electronic display devices, the electronic display may also enable the user to communicate information to the electronic display and/or a computing system that includes the electronic display. For example, the electronic display may be a touch-sensitive display, which may detect a person's touch on the surface of the electronic display by using a touch sensor system. More specifically, the electronic display may detect occurrence and/or position of the person's touch based at least in part on an impedance (e.g., capacitance) change in the electronic display caused by the person's touch.

At a given time, the electronic display may generally either write image data to the display pixels or check for an impedance change via touch sensing. Performing touch sensing while writing image data to the display pixels could introduce substantial noise into either or both subsystems, so these are generally not done simultaneously. Thus, when image data is being written to the pixels, a user touch may be undetected. Similarly, when checking for a user touch, the electronic display may stop writing image data. As such, in operation, the electronic display may alternate between writing image data to the pixels and checking for a user touch. However, electrical signals from the touch sensor system and the pixels display panel could still interfere with one another. For example, noise from the touch sensor system could produce image artifacts on the display or noise from the display could affect the sensitivity of the touch sensor system.

The present disclosure generally relates to improving touch detection sensitivity of touch-sensitive electronic displays while substantially reducing an occurrence of visual artifacts on the display. More specifically, the touch detection sensitivity may be improved by applying interlaced display driving to the display pixels on the electronic displays. In fact, the electronic display may alternate between writing portions of image frames and checking for user touch. For example, the electronic display may write a first portion of an image frame to one or more pixels of the electronic display, pause the writing of the image frame, check for a user touch, and write a second portion of the image frame to additional pixels of the display. As used herein, pausing the writing of an image frame to check for a user touch is generally referred to as an "intra-frame pause."

However, pausing in the middle of writing an image frame could cause perceivable visual artifacts on the electronic display. More specifically, visual artifacts could arise when a first portion of image data is written to a first contiguous set of rows of display pixels (e.g., halfway down the electronic display) before pausing for an intra-frame pause to perform touch sensing. This results in a slight delay between writing the first portion of the image frame to the first set of rows and writing a second portion of the image frame to a second set of rows. Owing to this delay, the display pixels of the second set of rows could have slightly different behavior (e.g., due to display pixel hysteresis, particularly when the pixels are changing brightness compared to a previous image frame). This delay could therefore cause even the same image data to look slightly different on the first set of rows and the second set of rows. For example, the second portion may appear darker or brighter than desired. As a consequence, a location where the delay of an intra-frame pause occurs could show up as a line through the display where a portion of a first image frame is displayed above the line and a portion of a second image frame is displayed below the line.

The perceptibility of these artifacts may be reduced by applying interlaced driving to the pixels of the electronic display so that the pauses are occurred at locations near or at an end of the electronic display panel. For example, first groups of rows (e.g., rows 1 and 2, then 5 and 6, then 9 and 10, and so forth) may be driven until half of the rows of pixels have been driven. At a partway point (e.g., a halfway point) in driving the rows of pixels with one frame of image data, the last row to be driven before an intra-frame pause may be at or near an end of the display panel. Following the intra-frame pause, second groups of rows (e.g., rows 3 and 4, then 7 and 8, then 11 and 12, and so forth) may be driven until the other half of the rows of pixels have been driven.

An intra-frame pause thus may not take place while pixels in one contiguous half of the electronic display, but rather after groups of rows of all parts of the electronic display have been programmed. This means that the intra-frame pauses allow the touch sensor system to operate during pauses after image data has been written across the electronic display (e.g., at or near the end of the screen). As such, image artifacts due to pausing row driving somewhere in the middle of the electronic display may be avoided, while also avoiding interference between the display driving and the operation of the touch sensor system.

In addition, for displays having more data lines (e.g., for higher resolution) or for a large display panel (e.g., 4000 data lines or more), the number of data lines in a frame may be so large that the line-time for each data line may be too short. For example, the time per frame for a display with refresh frequency 120 Hz is about 8.3 milliseconds (ms), and the active frame time is about 7.3 milliseconds, assuming 0.5 milliseconds vertical blanking period (during which no data is written to nor displayed by the pixels of the electronic display) and 0.5 milliseconds intra-frame pause period. Accordingly, the line-time for each data line per frame on the display would be only about 1.8 microseconds (μs) per frame assuming the large display having 4000 data lines. For displays with higher refresh frequency (e.g., 240 Hz, 480 Hz, 960 Hz) or with large numbers of data lines, the line-time for each data line per frame on the display is even shorter. The line-time for each data line may be extended by driving multiple rows (e.g., two rows) of pixels of the electronic display at a time and having more than one data lines (e.g., double data-line) per column of sub-pixels, where odd-numbered sub-pixels in a column may be driven by a first dataline and even-numbered sub-pixels in the column may be driven by a second dataline. Applied to the example described above, using double data-line may extend the line time for each data line to double the length of 1.8 microseconds, i.e., 3.6 microseconds.

Accordingly, a combination of interlaced driving to put the pauses occurrence locations at or near an end of an electronic display and double data-line driving may be used to reduce image artifacts and improve touch sensitivity for large displays or displays with more data lines (e.g., for higher resolution) and/or higher refresh frequency (e.g., 240 Hz). For instance, rows of pixels of the electronic display may be driven multiple rows at a time in an interlaced pattern. For example, rows 1 and 2 may be driven, then rows 5 and 6 may be driven, and so forth, until half of the rows of pixels have been driven. At a partway point (e.g., a halfway point) in driving the rows of pixels with one frame of image data, the last two rows to be driven may be at or near an end of the display panel. At this point, pixel driving may pause to allow the touch sensor system to perform touch sensing at the halfway. After the pause, the other rows of pixels may be driven multiple rows at a time before taking another pause to allow the touch sensor system to operate. Because the pauses to allow the touch sensor system to operate take place where the last pixels to be driven are at or near the end of the screen, image artifacts due to pausing row driving somewhere in the middle of the electronic display may be avoided, while also avoiding interference between the display driving and the operation of the touch sensor system.

BRIEF DESCRIPTION OF THE DRAWINGS

Various aspects of this disclosure may be better understood upon reading the following detailed description and upon reference to the drawings described below.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

This disclosure relates to electronic displays that drive multiple rows of pixels of the electronic displays in an interlaced pattern to adjust the locations of the pauses for touch sensing to an end of the display panel. Because the pauses to allow the touch sensor system to operate take place where the last pixels to be driven are at the end of the screen, image artifacts due to pausing row driving somewhere in the middle of the electronic display may be avoided, while also avoiding interference between the display driving and the operation of the touch sensor system.

Figure 1:
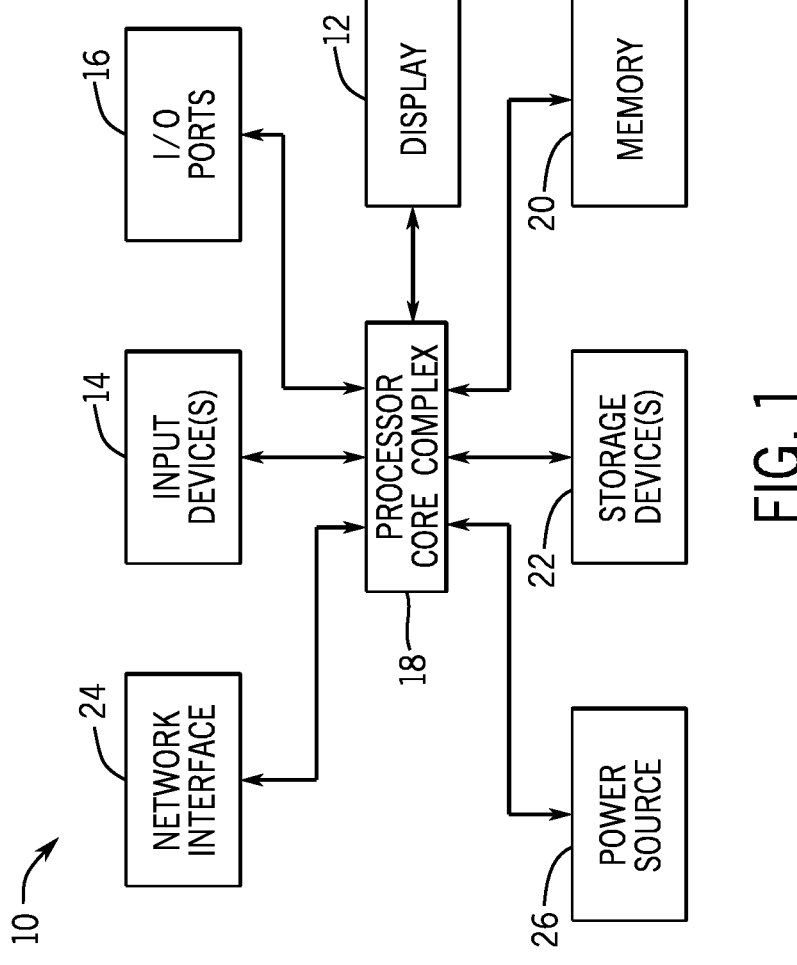
FIG. 1 is a schematic block diagram of an electronic device, in accordance with an embodiment.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processor(s) or processor cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable gate arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting occurrence or position of an object touching the surface of the electronic display 12.

In addition to enabling user inputs, the electronic display 12 may be a display panel with one or more display pixels. For example, the electronic display 12 may include a self-emissive pixel array having an array of one or more of self-emissive pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as a LED or a micro-LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device, or an I/O port 16.

Figure 2:
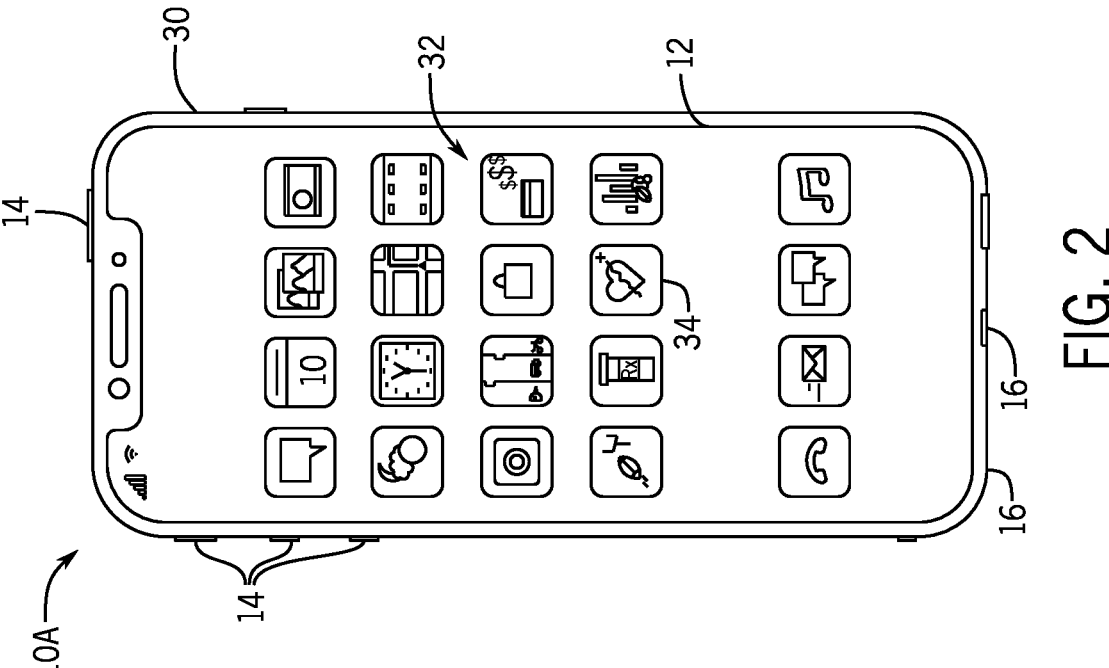
FIG. 2 is a front view of a mobile phone representing an example of the electronic device of FIG. 1, in accordance with an embodiment.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
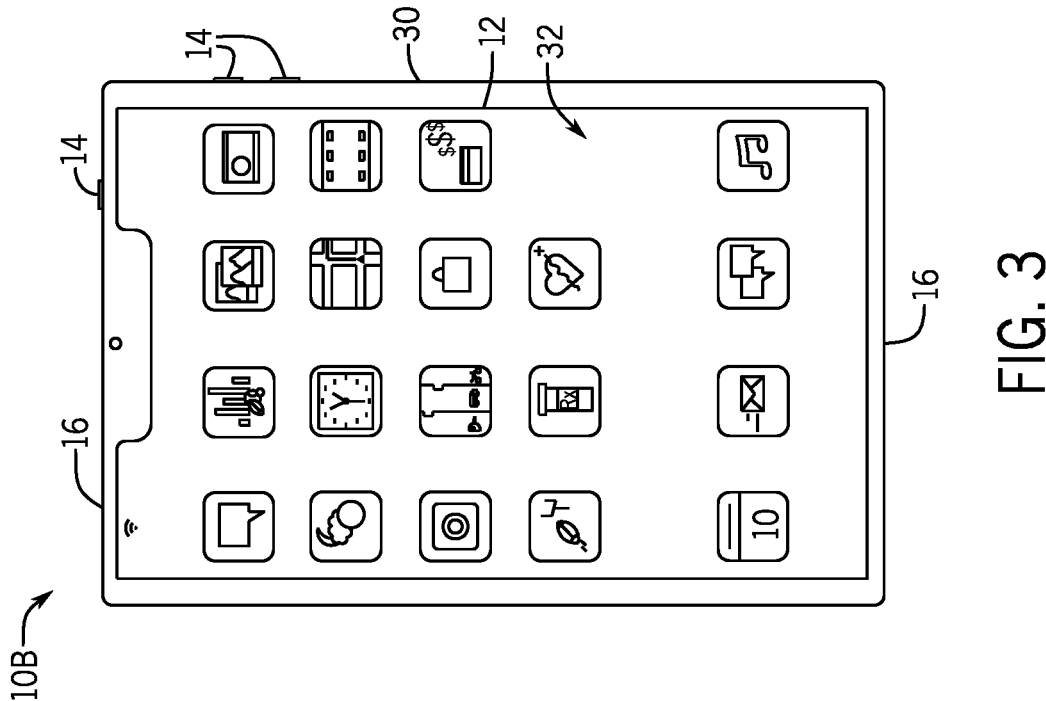
FIG. 3 is a front view of a tablet device representing an example of the electronic device of FIG. 1, in accordance with an embodiment.
Figure 4:
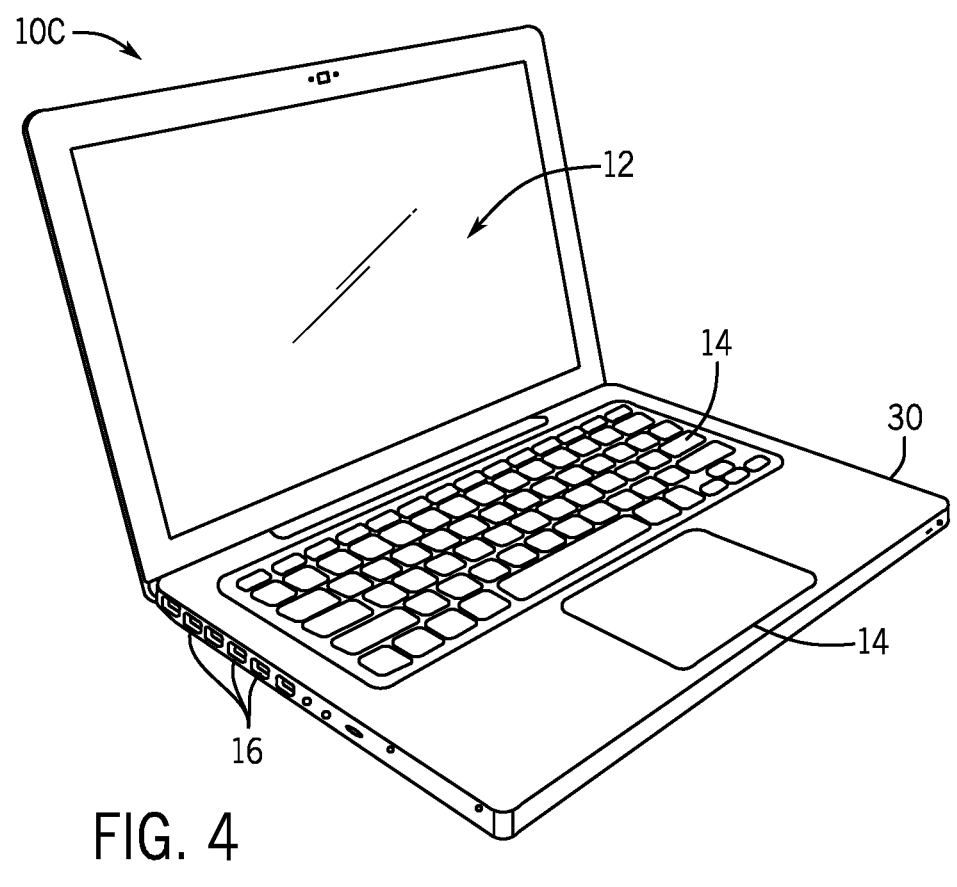
FIG. 4 is a front view of a notebook computer representing an example of the electronic device of FIG. 1, in accordance with an embodiment.
Figure 5:
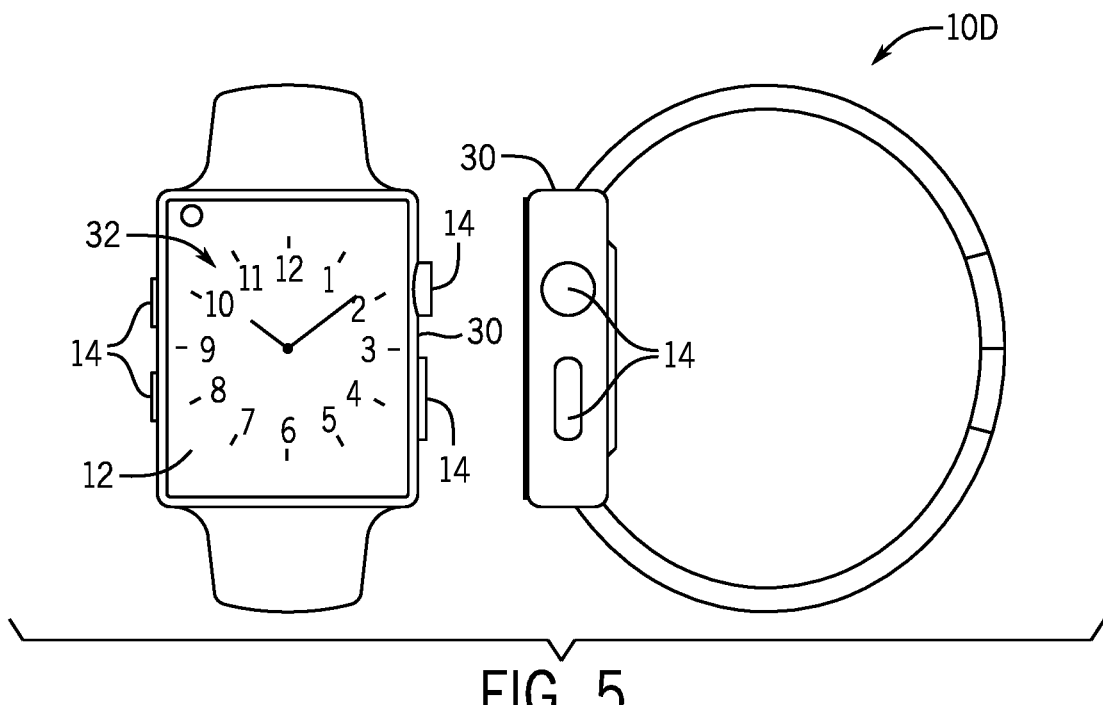
FIG. 5 are front and side views of a watch representing an example of the electronic device of FIG. 1, in accordance with an embodiment.

Another example of a suitable electronic device 10, specifically a tablet device is shown in FIG. 3. The tablet device 10B may be any IPAD® model available from Apple Inc. A further example of a suitable electronic device 10, specifically a computer is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
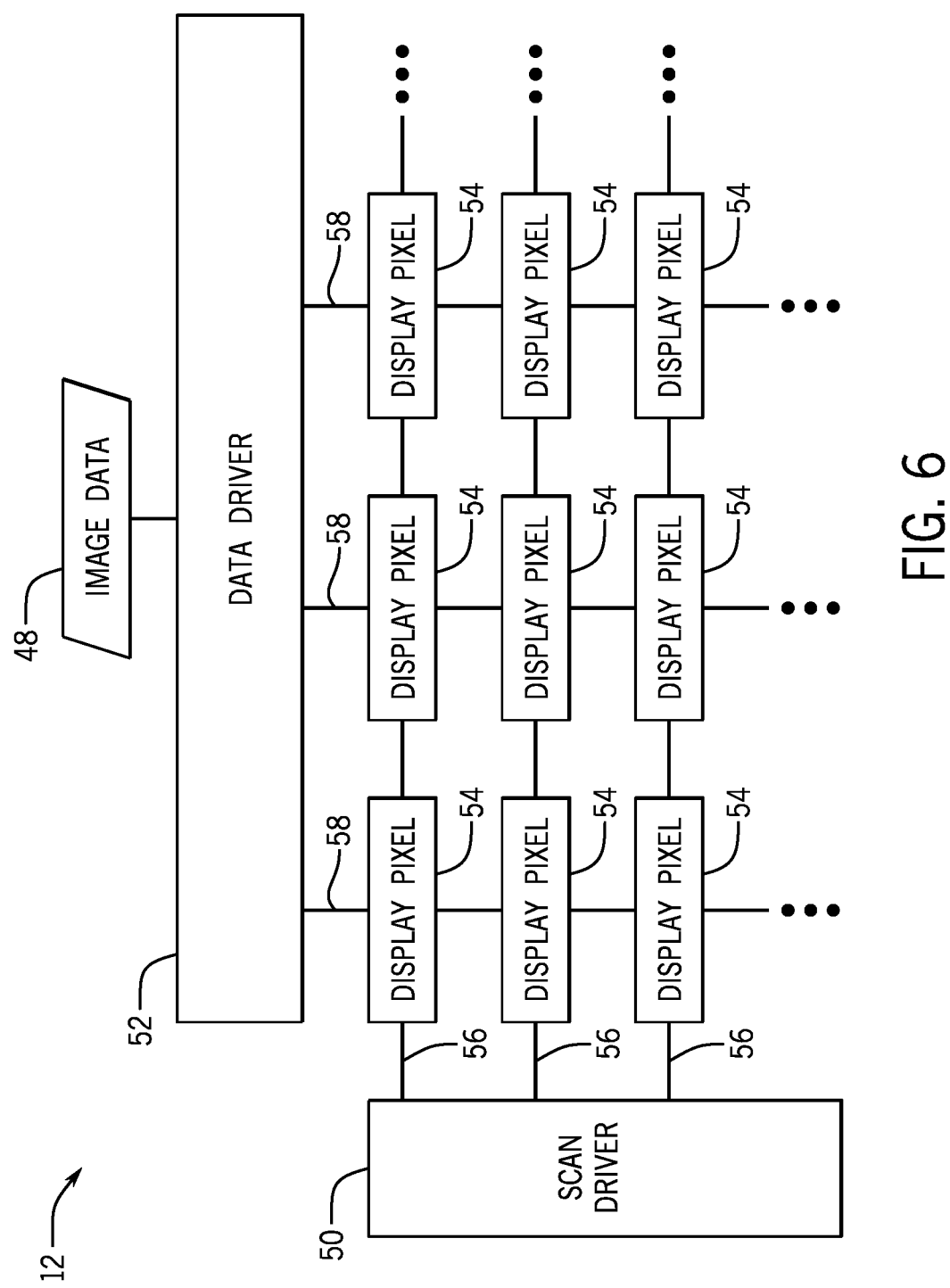
FIG. 6 is a block diagram of an electronic display of the electronic device, in accordance with an embodiment.

As shown in FIG. 6, the electronic display 12 may receive image data 48 for display on the electronic display 12. The electronic display 12 includes display driver circuitry that includes scan driver circuitry 50 and data driver circuitry 52 that can program the image data 48 onto display pixels 54. The display pixels 54 may each contain one or more self-emissive elements, such as a light-emitting diodes (LEDs) (e.g., organic light emitting diodes (OLEDs) or micro-LEDs (μLEDs)). Different display pixels 54 may emit different colors (e.g., red, green, blue (RGB)). For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use cyan, magenta, and yellow (CMY), or others.

The scan driver 50 may provide scan signals (e.g., pixel reset, data enable, on-bias stress) on scan lines 56 to control the display pixels 54 by row. For example, the scan driver 50 may cause a row of the display pixels 54 to become enabled to receive a portion of the image data 48 from data lines 58 from the data driver 52. In this way, an image frame of image data 48 may be programmed onto the display pixels 54 row by row. Other examples of the electronic display 12 may program the display pixels 54 in groups other than by row.

Figure 7:
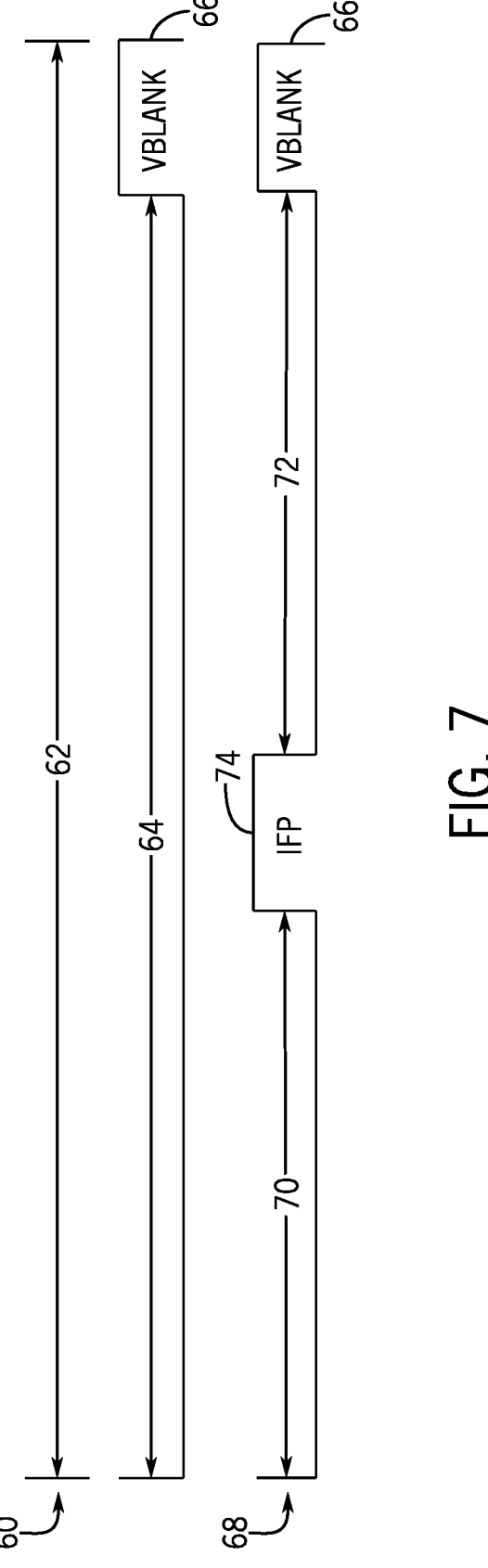
FIG. 7 illustrates example timing diagrams for image frames, in accordance with an embodiment.

FIG. 7 illustrates a first timing diagram 60 for an image frame 62. The first timing diagram 60 for the image frame 62 includes an active frame 64 and a blanking frame 66. During the active frame 64, image data may be written to pixels of the electronic display 12. The blanking frame 66 may represent a vertical blanking (VBLANK) period during which no data is written to nor displayed by the pixels of the electronic display 12. In some embodiments, the image frame 62 may have a duration of about 8.3 milliseconds (ms), and the vertical blanking may have a duration about 500 microseconds (μs).

A second timing diagram 68 for the image frame 62 includes the active frame 64 and the blanking frame 66. However, the active frame 64 is divided into a first portion and a second portion 72 by an intra-frame pause (IFP) 74. As discussed above, writing image data to the pixels of the electronic display 12 may stop during the intra-frame pause 74. During this time, for example, the electronic display 12 may check for a touch input. In some embodiments, a length (e.g., duration) of the intra-frame pause 74 may be about 500 microseconds (μs).

As mentioned above, the present disclosure relates to adjusting the occurrence locations of the pauses, including the intra-frame pause (IFP) 74 and the vertical blanking (VBLANK) period 66, to be at or near an end of the electronic display 12 to reduce an occurrence of visual artifacts on the electronic display 12 and improve touch detection sensitivity of the electronic display 12.

Figure 8:
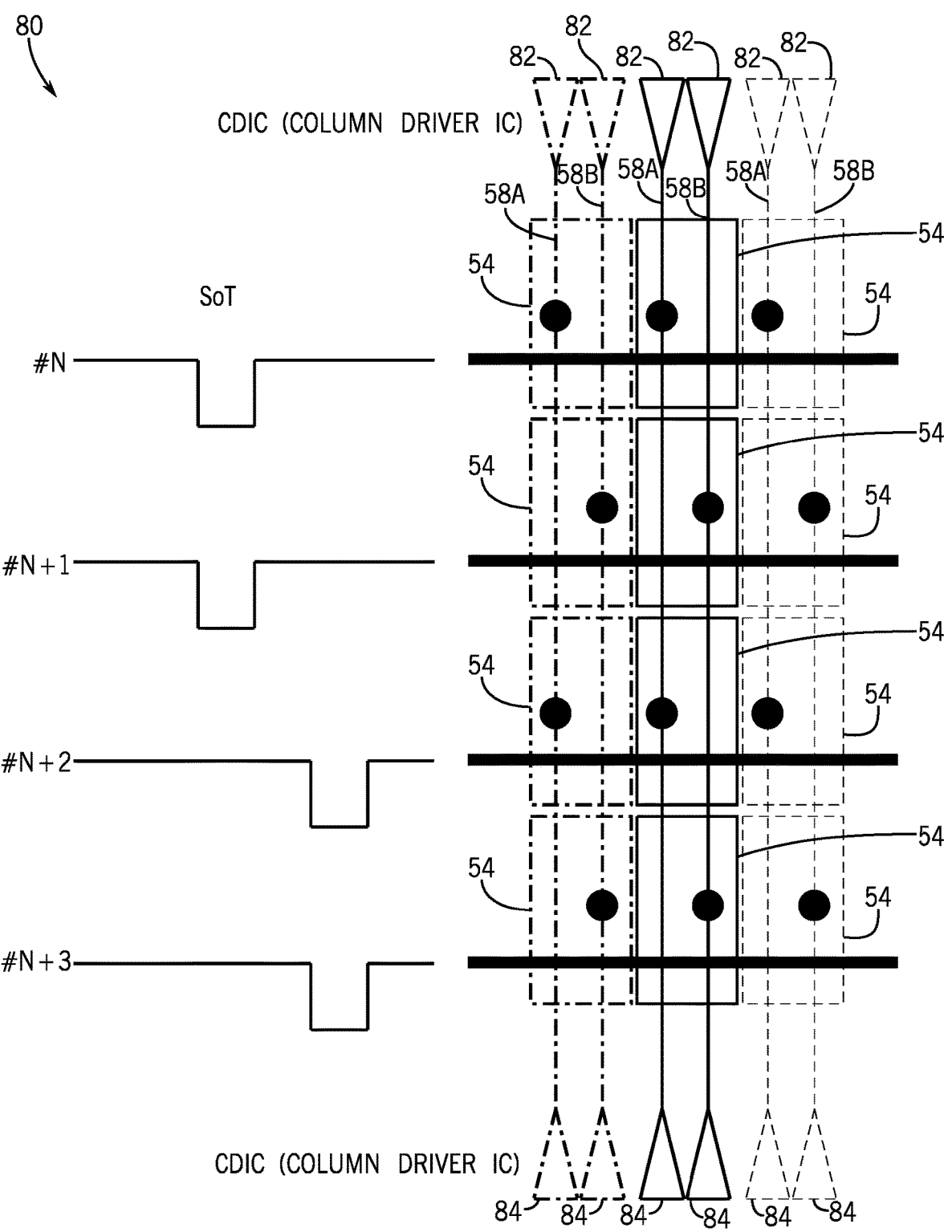
FIG. 8 illustrates example timing diagrams for double data-line driving, in accordance with an embodiment.

FIG. 8 illustrates a timing diagram 80 showing an embodiment of a portion of the electronic display 12 with dual-data-line display panel and double row driving. In FIG. 8, two data lines 58A and 58B are connected to each display pixel 54. For instance, rows 1 and 2 may be enabled, during which period each of the two data lines 58A and 58B may be operated by a respective column driver integrated circuit (CDIC) 82 at a first end of the electronic display 12 or/and a respective column driver integrated circuit (CDIC) 84 at a second end of the electronic display 12; then rows 3 and 4 may be enabled, and so forth (e.g., rows with number n and n+1, n=1,2,3 . . . ). The line-time for each data line 58 may be extended by driving multiple rows (e.g., two rows) of pixels of the electronic display simultaneously and having more than one data lines (e.g., double data-line) per column of sub-pixels. For example, in the embodiment described above, using double data-line may extend the line time for each data line to double the length. There may be a time offset between operations of two adjacent data lines for the image data 48 to be programmed into a respective display pixel 54 on the two enabled rows. For example, when rows #N and #N+1 are enabled, the display pixel 54 on the row #N may receive a portion of the image data 48 from data line 58A from the data driver 52, and the display pixel 54 on the row #N+1 may receive a portion of the image data 48 from data line 58B from the data driver 52. Then when rows #N+2 and #N+3 are enabled, the display pixel 54 on the row #N+2 may receive a portion of the image data 48 from data line 58A from the data driver 52, and the display pixel 54 on the row #N+3 may receive a portion of the image data 48 from data line 58B from the data driver 52. Consequently, in the illustrated embodiment, each data line may effectively have double the length of line time since each column of display pixels 54 can receive image data on two display pixels 54 of different rows via different data lines. It should be noted that, in certain embodiment, more than two data lines may be operated at a time, and/or more than two rows may be driven at a time to extend the line time for each data line. In some examples, there may be three data lines 58 per column of display pixels 54, allowing three display pixels 54 to be driven at the same time. In other examples, there may be four data lines 58 per column of display pixels 54, allowing four display pixels 54 to be driven at the same time.

Figure 9:
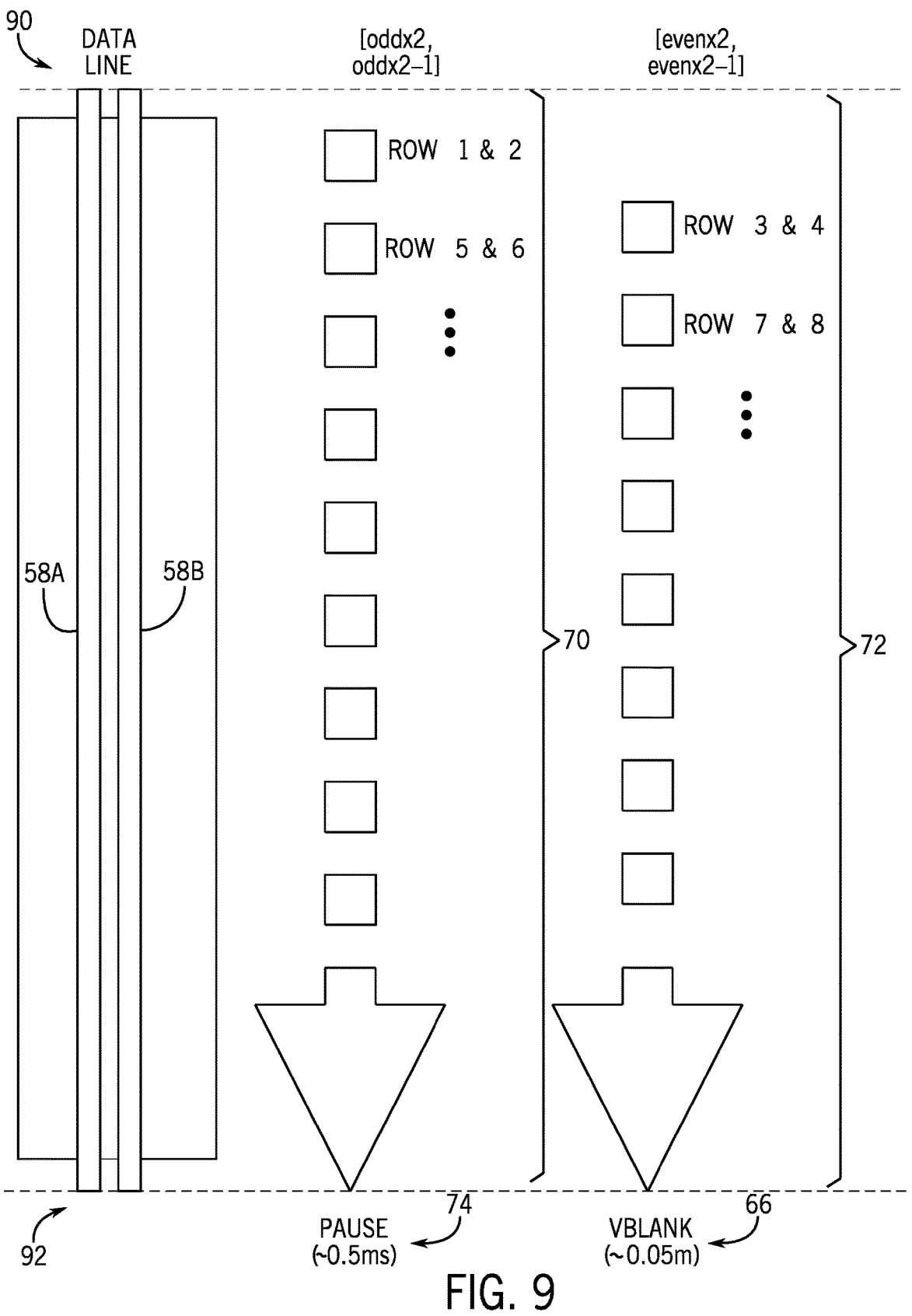
FIG. 9 is a diagram showing an embodiment of a portion of the electronic display with a dual-data-line display panel and double row interlaced driving, in accordance with an embodiment.

FIG. 9 illustrates a diagram 90 showing an embodiment of a portion of the electronic display 12 with dual-data-line display panel and double row interlaced driving. In the diagram 90, two data lines 58A and 58B are connected to each display pixel 54, and double row interlaced driving is used. For example, during the first portion 70 of the active frame 64, rows 1 and 2 may be enabled, during which period each of the two data lines 58A and 58B may be operated as described above in FIG. 8; then rows 5 and 6 may be enabled, and so forth (e.g., rows with number 2h and 2h−1, his an odd number, h=1,3,5 . . . ), until half of the rows of pixels have been driven. The last two rows to have been driven in the first portion 70 may be at or near an end 92 of the electronic display 12. At this point, pixel driving may pause to allow the touch sensor system to perform touch sensing at the halfway, i.e., the intra-frame pause (IFP) 74. After the intra-frame pause (IFP) 74, the second portion 72 of the active frame 64 starts, and other rows of pixels may be driven multiple rows at a time until the blanking frame 66 occurs, e.g., rows 3 and 4 may be enabled and then rows 7 and 8, etc. (e.g., rows with number 2m and 2m−1, m is an even number, m=2,4,6 . . . ). In some embodiments, the image frame 62 may have a duration of about 8.3 milliseconds (ms), the intra-frame pause (IFP) 74 may have a duration about 0.5 milliseconds (ms), the vertical blanking (VBLANK) 66 may have a duration about 0.5 milliseconds (ms), and the active frame 64 may have a duration about 7.3 milliseconds (ms). The line-time for each data line may be extended by driving multiple rows (e.g., two rows) of pixels of the electronic display and having more than one data lines (e.g., double data-line) per column of sub-pixels. For example, in the embodiment described above, using a double data-line arrangement may extend the line time for each data line to double the length of the display without extending the time involved in refreshing the display. There may be a time offset between operations of the two data lines of the double data-line sub-pixel for the image data 48 to be programmed into the corresponding display pixel 54, as described in FIG. 8. It should be noted that, in certain embodiments, more than two data lines may be operated at a time, and/or more than two rows may be driven at a time in an interlaced pattern to extend the line time for each data line.

Figure 10:
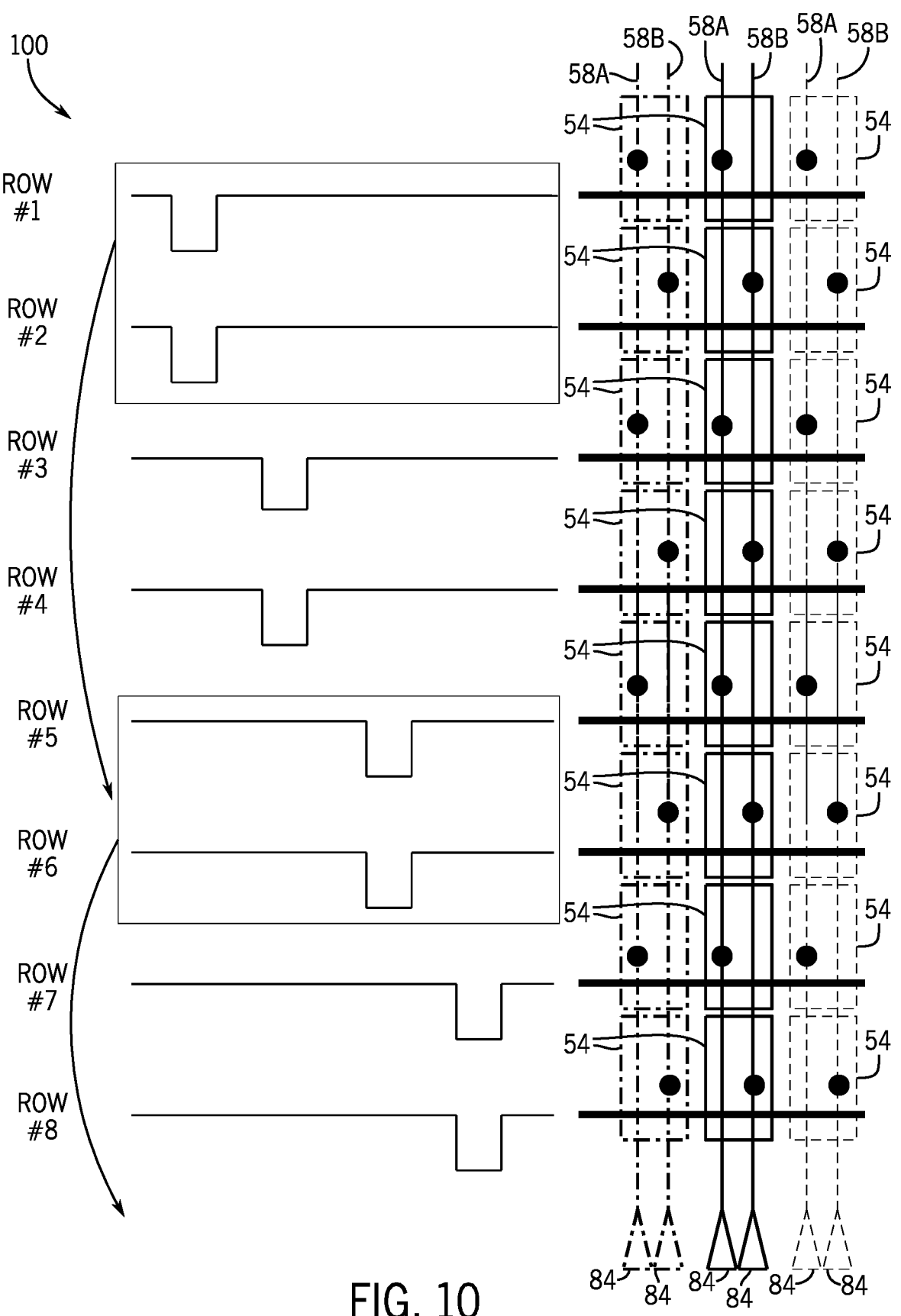
FIG. 10 illustrates a timing diagram showing an embodiment of a portion of the electronic display with a dual-data-line display panel and double row interlaced driving, in accordance with an embodiment.

FIG. 10 illustrates a timing diagram 100 showing an embodiment of a portion of the electronic display 12 with dual-data-line display panel and double row interlaced driving. In FIG. 10, two data lines 58A and 58B are connected to each display pixel 54. For instance, during the first portion 70 of the active frame 64, rows 1 and 2 may be enabled, during which period each of the two data lines 58A and 58B may be operated as described above in FIG. 8; then rows 5 and 6 may be enabled, and so forth (e.g., rows with number 2h and 2h−1, his an odd number, h=1,3,5 . . . ), until half of the rows of pixels have been driven. The last two rows to have been driven in the first portion 70 may be at or near an end 92 of the electronic display 12. At this point, pixel driving may pause to allow the touch sensor system to perform touch sensing at the halfway, i.e., the intra-frame pause (IFP) 74. After the intra-frame pause (IFP) 74, the second portion 72 of the active frame 64 starts, and other rows of pixels may be driven multiple rows at a time until the blanking frame 66 occurs, e.g., rows 3 and 4 may be enabled and then rows 7 and 8, etc. (e.g., rows with number 2m and 2m−1, m is an even number, m=2,4,6 . . . ).

Figure 11:
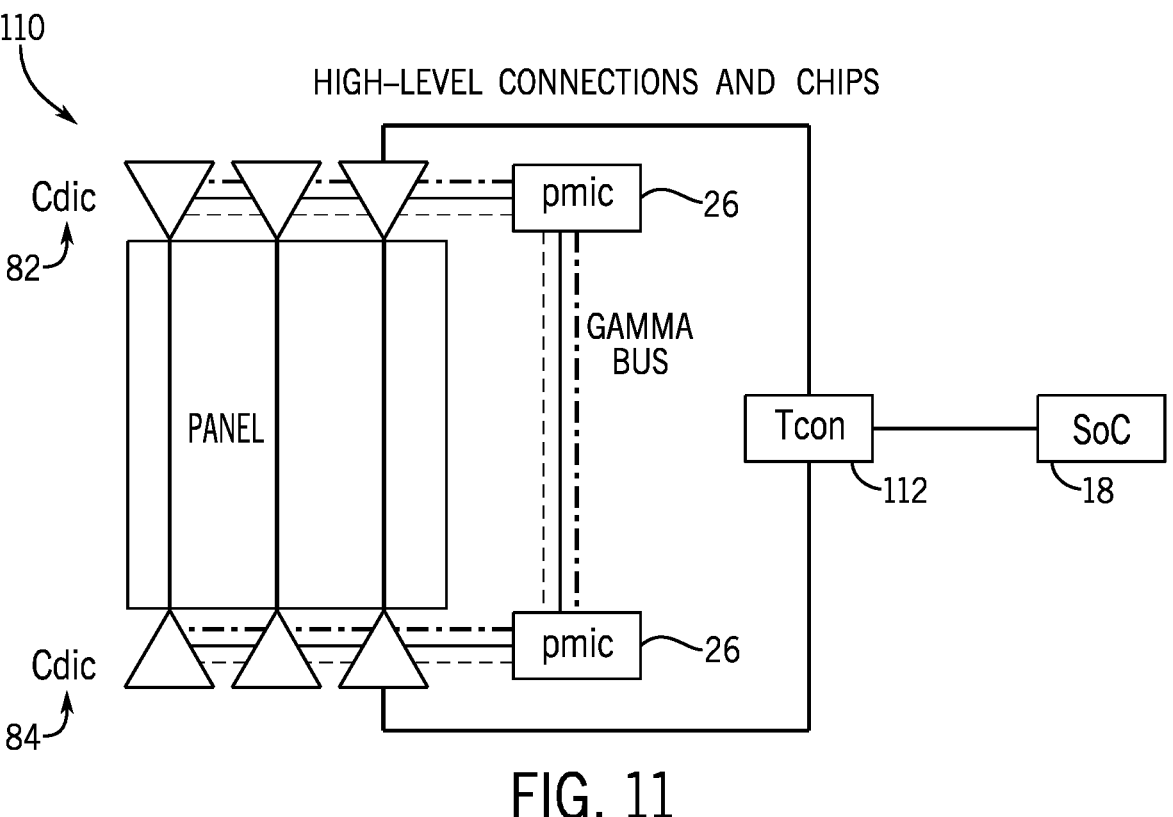
FIG. 11 illustrates a schematic view of an embodiment of a display panel with double data-line per column of sub-pixels and top and bottom driving, in accordance with an embodiment.

FIG. 11 illustrates a schematic view of an embodiment of a display panel 110 with double data-line per column of sub-pixels and top and bottom driving for large displays. One or more power sources 26 (with power management integrated circuit, PMIC) may be used at different locations of the display panel 110 to generate gamma reference voltages. The processor core complex 18 (Soc) may control the TCON 112 (timing controller board), which may control the operations of the column driver integrated circuits (CDIC) 82 and 84 for multiple data line (e.g., double data-line) driving and/or multiple data line interlaced driving described above.

Figure 12:
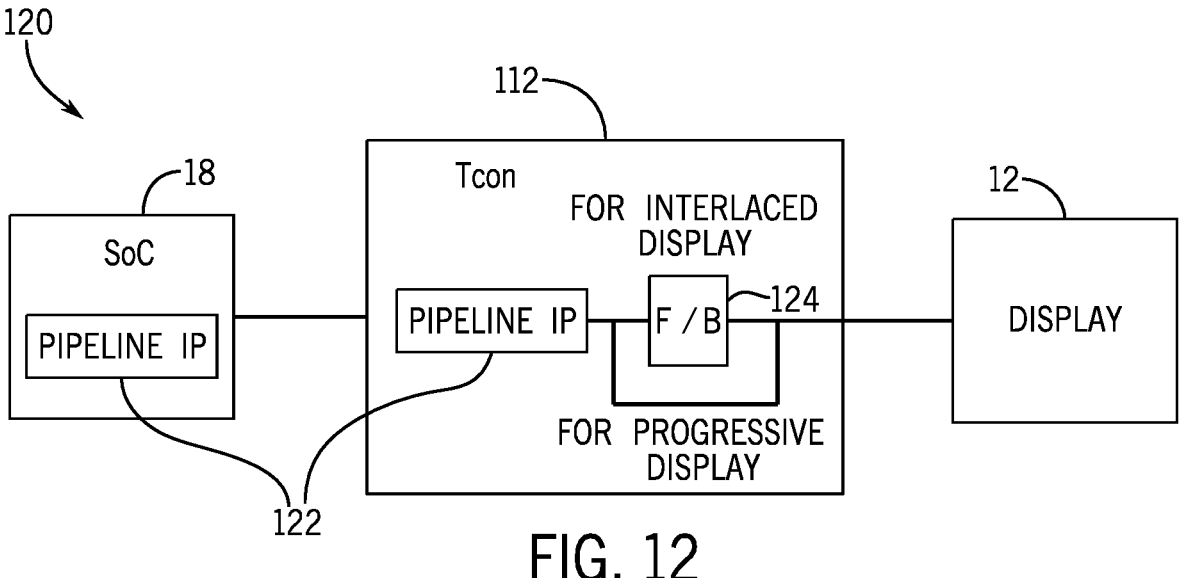
FIG. 12 is a block diagram for a system working with interlaced display and progressive display, in accordance with an embodiment.

FIG. 12 illustrates a block diagram for a system 120, in which the interlaced display in the present disclosure is configured to work compatibly with the image processing pipeline designed for progressive display (PIPELINE) 122 by using a half-a-frame buffer (F/B) 124. In displays using progressive driving, a few tens of row latency may be used between the portion of image data 48 prepared by the PIPELINE 122 and the portion of image data 48 under scanning on the electronic display 12. However, for interlaced driving, rows are not driven successively, accordingly, more latency time needed to use the interlaced driving with the PIPELINE 122. For example, during the first portion of the active frame 64, only half of rows (e.g., odd rows) prepared by the PIPELINE 122 may be usable for the interlaced display since the other half of the rows (e.g., even rows) may be used in the second portion 72 of the active frame 64. The half-a-frame buffer 124 may store half of a frame of image data 48 processed by the PIPELINE 122 to be used for interlaced driving so that the time latency is sufficient for the interlaced driving. As illustrated in FIG. 12, the half-a-frame buffer 124 is selected when interlaced display is used for the display 12, and the half-a-frame buffer 124 may be bypassed or disabled (e.g., turned off or disconnected) when progressive display is used for the display 12. Accordingly, the system 120 may be used for both interlaced display and progressive display.

Figure 13:
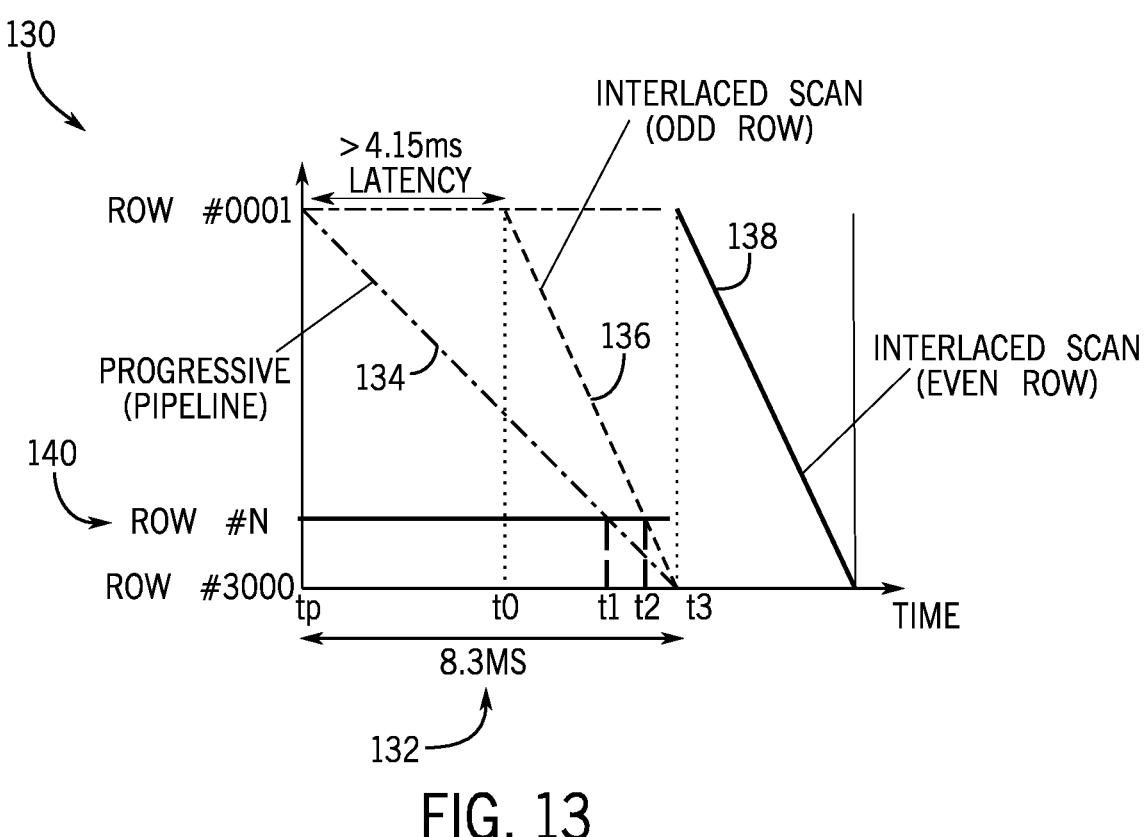
FIG. 13 is a plot showing one embodiment of a time latency for the system of FIG. 12, in accordance with an embodiment.

FIG. 13 illustrates a plot 130 showing one embodiment of a time latency for the system 120 when interlaced display (single row interlaced driving is illustrated in FIG. 13) is used with the PIPELINE 122. In the illustrated embodiment, an image frame 132 displaying on the display 12 has a duration of 8.3 milliseconds (ms) with 3000 rows by way of example (i.e., row #0001 to row #3000). There may be more or fewer rows in other embodiments. A curve 134 shows the rows of the image data 48 of the image frame 132 prepared by the PIPELINE 122 with respect to time with a starting time at tp1. The half-a-frame buffer 124 may store at least half of the 3000 rows of the image data 48 of the frame 132 prepared by the PIPELINE 122, which may provide at least 4.15 ms latency for the interlaced display. Accordingly, the half-a-frame buffer 124 stores sufficient rows of image data 48 of the frame 132 prepared by the PIPELINE 122 for the interlaced display.

In FIG. 13, a curve 136 shows the scanning of the odd rows of the image data 48 of the image frame 132, and a curve 138 shows the scanning of the even rows of the image data 48 of the image frame 132 (IFP and VBLANK not illustrated in the curves 136 and 138 in FIG. 13). In FIG. 13, the odd rows of the image frame 132 are driven first, then the even rows of the image frame 132 are driven. In FIG. 13, when the scanning of the odd rows (i.e., curve 136) starts at t0, which has a time latency of at least 4.15 ms with respect to the starting time tp1 of the curve 134 (i.e., t0−tp1>4.15 ms), the PIPELINE 122 may have at least half of the 3000 rows of the image frame 132 prepared. During the scanning of the odd rows, the PIPELINE 122 continues preparing the rest rows of the image data 48 of the image frame 132, and for a row 140 with row number N (N is an odd number in the illustrated example), the PIPELINE 122 prepares the row 140 at a time t1, which is before a scanning time t2 of the row 140 on the curve 136. In the illustrated embodiment, the PIPELINE 122 is configured to finish preparing the rest rows of the image data 48 of the image frame 132 during the scanning of the odd rows, i.e., curve 136, and the PIPELINE 122 is configured to have a row prepared before the moment it needs to be scanned on the curve 136. For example, when the curve 136 is scanning row #2997, the PIPELINE 122 may be preparing row #2999, and when the curve 136 is scanning row #2999, the PIPELINE 122 may be preparing row #3000. Consequently, when the curve 136 finishes scanning at time t3, the PIPELINE 122 has all the 3000 rows of the image frame 132 prepared, and the curve 138 may use the even rows of the prepared 3000 rows of the image frame 132 for interlaced scanning starting at time t3. It should be noted that, although single row interlaced driving is illustrated in FIG. 13, the system 120 may be used for multiple rows driving (e.g., two rows driving).

Figure 14:
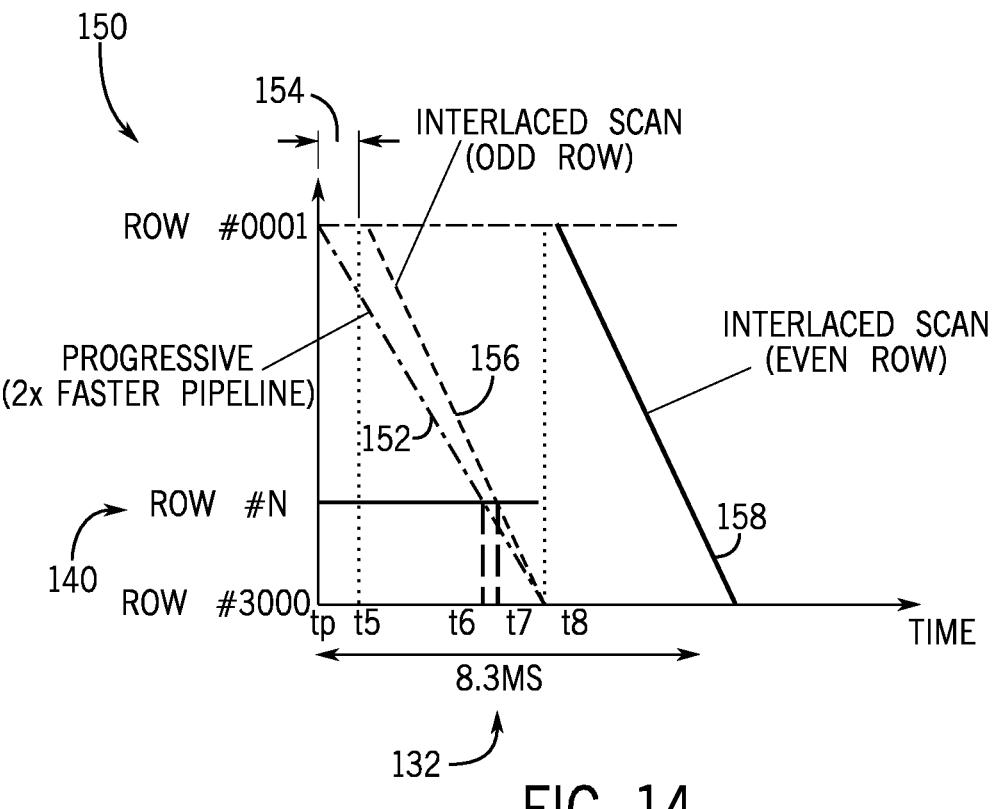
FIG. 14 is a plot showing another embodiment of a time latency for the system of FIG. 12, in accordance with an embodiment.

FIG. 14 illustrates a timing plot 150 showing another embodiment of a time latency for the system 120 when interlaced display is used with the PIPELINE 122. In FIG. 14, when it is used in the interlaced display, the PIPELINE 122 (in both Soc 18 and Tcon 112) may run two times faster than its operating speed in the progressive display.

In, FIG. 14, a curve 152 shows the rows of the image data 48 of the image frame 132 prepared by the PIPELINE 122 with respect to time with a starting time at tp2. A time latency 154 is used for the interlaced display. A curve 156 shows the scanning of the odd rows of the image data 48 of the image frame 132, and a curve 158 shows the scanning of the even rows of the image data 48 of the image frame 132 (IFP and VBLANK not illustrated in the curves 156 and 158 in FIG. 14, and single row driving is used in FIG. 14). In FIG. 14, the odd rows of the image frame 132 are driven first, then the even rows of the image frame 132 are driven. In FIG. 14, when the scanning of the odd rows (i.e., curve 156) starts at t5, the PIPELINE 122 may have several rows of the image frame 132 prepared within the latency time 154. During the scanning of the odd rows, the PIPELINE 122 continues preparing the rest rows of the image data 48 of the image frame 132, and for the row 140 with row number N (N is an odd number in the illustrated example), the PIPELINE 122 prepares the row 140 at time t6, which is before the scanning time t7 of the row 140 on the curve 156. In the illustrated embodiment, the PIPELINE 122 is configured to run two times faster than its operating speed in the progressive display and finish preparing the rest rows of the image data 48 of the image frame 132 during the scanning of the odd rows, i.e., curve 156. The PIPELINE 122 is configured to have a row prepared before the moment it needs to be scanned on the curve 156. For example, when the curve 156 is scanning row #2997, the PIPELINE 122 may be preparing row #2999, and when the curve 136 is scanning row #2999, the PIPELINE 122 may be preparing row #3000. Consequently, when the curve 156 finishes scanning at time t8, the PIPELINE 122 has all the 3000 rows of the image frame 132 prepared, and the curve 158 may use the even rows of the prepared 3000 rows of the image frame 132 for interlaced scanning starting at t8.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic display comprising:
   a column of display pixels comprising a plurality of rows of display pixels;
   respective scan lines coupled to the plurality of rows of display pixels and configured to enable a first set of display pixels of the column of display pixels and a second set of display pixels of the column of display pixels to receive image data at a same first time, wherein the first set of display pixels and the second set of display pixels are in different rows of the plurality of rows of display pixels;
   data lines comprising a first data line coupled to the first set of display pixels of the column of display pixels and a second data line coupled to the second set of display pixels of the column of display pixels to enable two display pixels from adjacent rows, one from the first set of display pixels and one from the second set of display pixels, to be programmed at a same second time;
   a frame buffer configured to be selected for programming the column of display pixels in an interlaced manner and disabled for programming the column of display pixels in a progressive manner; and
   display driver circuitry configured to drive the respective scan lines and the data lines to enable an intra-frame pause to occur near an end area of the electronic display.

2. The electronic display of claim 1, comprising:
   first and second column drivers configured to drive first image data over the first data line; and
   third and fourth column drivers configured to drive second image data over the second data line.

3. The electronic display of claim 2, wherein the first and third column drivers are disposed on one end of the column of display pixels and the second and fourth column drivers are disposed on another end of the column of display pixels.

4. The electronic display of claim 1, wherein the display driver circuitry is configured to program the column of display pixels in a progressive manner two display pixels at a time.

5. The electronic display of claim 1, wherein the display driver circuitry is configured to program the column of display pixels in an interlaced manner two display pixels at a time.

6. The electronic display of claim 5, wherein the two display pixels are adjacent to one another.

7. The electronic display of claim 6, wherein the display driver circuitry is configured to take the intra-frame pause after programming a first half of the column of display pixels.

8. An electronic device comprising:

processing circuitry configured to generate image data; and an electronic display configured to program multiple rows of display pixels with different pixel data of the image data at a same first time, wherein the electronic display comprises:

a column of display pixels comprising a plurality of rows of display pixels;

respective scan lines coupled to the plurality of rows of display pixels and configured to enable a first set of display pixels of the column of display pixels and a second set of display pixels of the column of display pixels to receive the image data at a same first time, wherein the first set of display pixels and the second set of display pixels are in different rows of the plurality of rows of display pixels;

data lines comprising a first data line coupled to the first set of display pixels of the column of display pixels and a second data line coupled to the second set of display pixels of the column of display pixels to enable two display pixels from adjacent rows, one from the first set of display pixels and one from the second set of display pixels, to be programmed at a same second time;

a frame buffer configured to be selected for programming the column of display pixels in an interlaced manner and disabled for programming the column of display pixels in a progressive manner; and display driver circuitry configured to drive the respective scan lines and the data lines to enable an intra-frame pause to occur near an end area of the electronic display.

9. The electronic device of claim 8, wherein the processing circuitry is configured to generate the image data one half-frame at a time.

10. The electronic device of claim 9, wherein the processing circuitry is configured to generate the image data for rows 2h and 2h−1 with h being an odd number for a first partial frame at one time and with h being an even number for a second partial frame at another time.

11. The electronic device of claim 8, wherein the electronic display is configured to program two rows of display pixels at the same first time.

12. The electronic device of claim 8, wherein the frame buffer is further configured to store half of an image frame of the image data to be displayed on the electronic display.

13. The electronic device of claim 12, wherein the electronic display is configured to:

receive a frame of the image data from the processing circuitry;

as pixel data of the frame of the image data is received, program a first half of the display pixels with a first half of the frame of the image data and store a second half of the frame of the image data in the frame buffer; and program a second half of the display pixels with the second half of the frame of the image data from the frame buffer.

14. The electronic device of claim 8, wherein the electronic display is configured to program the multiple rows of the display pixels in a double-row interlaced manner.

15. The electronic device of claim 8, wherein the electronic display is configured to program the multiple rows of the display pixels in a double-row progressive manner.

16. The electronic device of claim 15, wherein the electronic display is configured to perform the intra-frame pause after programming half of the display pixels in the double-row progressive manner.

17. A method, comprising:

generating image data for an electronic display;

programming multiple rows of display pixels of a plurality of rows of display pixels of the electronic display with different pixel data of the image data at a same first time, wherein the multiple rows of display pixels comprise adjacent rows of display pixels, wherein the plurality of rows of display pixels are programmed in an interlaced manner to enable an intra-frame pause to occur near an end area of the electronic display, and wherein the multiple rows of display pixels are selected by respective scan lines to receive the image data at a same second time;

enabling two display pixels of a column of display pixels of the electronic display to be programmed at a same time, and data lines comprising a first data line coupled to a first set of display pixels of the column of display pixels and a second data line coupled to a second set of display pixels of the column of display pixels to enable the two display pixels, one from the first set of display pixels and one from the second set of display pixels, to be programmed at the same time;

and selecting a frame buffer for programming the column of display pixels in an interlaced manner and disabling the frame buffer for programming the column of display pixels in a progressive manner.

18. The method of claim 17, comprising generating the image data one half-frame at a time.

19. The method of claim 18, comprising generating the image data for rows 2h and 2h−1 with h being an odd number for a first partial frame at one time and with h being an even number for a second partial frame at another time.

20. The method of claim 17, comprising programing the multiple rows of the display pixels in a double-row interlaced manner.

21. The method of claim 17, comprising programing the multiple rows of the display pixels in a double-row progressive manner.

22. The method of claim 21, wherein the electronic display is configured to perform the intra-frame pause after programming half of the display pixels in the double-row progressive manner.

* * * * *